M. T. DENNE.
CAM OPERATED TRANSMISSION MECHANISM.
APPLICATION FILED SEPT. 22, 1914.

1,225,782.

Patented May 15, 1917.

Witnesses.
J. Morrill Fuller
William E. Gagen

Inventor
Mark Thomas Denne,
by Heard Smith & Tennant
Atty's.

UNITED STATES PATENT OFFICE.

MARK THOMAS DENNE, OF RUSHDEN, ENGLAND.

CAM-OPERATED TRANSMISSION MECHANISM.

1,225,782.   Specification of Letters Patent.   Patented May 15, 1917.

Application filed September 22, 1914. Serial No. 863,019.

*To all whom it may concern:*

Be it known that I, MARK THOMAS DENNE, a subject of the King of Great Britain and Ireland, residing at Rushden, Northamptonshire, England, have invented new and useful Improvements in and Relating to Cam-Operated Transmission Mechanism, of which the following is a specification.

This invention has reference to improvements in and relating to cam-operated devices for transmitting motion from an operating cam to the operating tools or implements of a machine, such, for instance, as a sewing machine.

Although oil tight casings have been provided in the case of comparatively simple machines in which it is advantageous that a portion—for example a crank shaft, gear wheels or the like—should run in an oil bath, it has heretofore not been found practicable to provide sewing machines with an oil tight casing so that the cam cylinder could not only be made to run in an oil bath, but that it would also be completely protected against the ingress of dust. This difficulty has been due to the fact that the means—including levers, slides and other parts having oscillatory or swinging movements—whereby movement is transferred from the several cam races or the like to the tools such as the needle, awl, looper, feed slide and presser foot, have been so constructed and applied that it would be necessary to provide the cam with a number of oil tight slides to permit the aforesaid oscillatory or swinging movements of the levers and other parts which obviously would not only very considerably increase the first cost of the machine, but the advantage derived from running the cam cylinder in an oil bath would be balanced or perhaps even more than balanced by the increase of friction due to the several oil tight slides; and the cost of keeping such sliding covers oil tight would also add considerably to the ultimate cost of the work.

The object of my invention is to so construct and apply mechanism intermediate the cam cylinder and the tools to be alternately operated that an oil tight and dust proof casing can be provided without unduly increasing either the first cost of the machine or the power required to drive it or the cost of keeping the parts oil tight.

To this end my invention consists of a machine having in combination with the usual cam cylinder or the equivalent an oil tight casing surrounding said cylinder and means whereby motion may be transmitted from the cams of said cylinder to the usual tools actuated thereby.

The aforesaid means may comprise mechanism a part of which consists of a rod or tube which is made to move either axially or rotatably or both axially and rotatably, one part of which rod is within the oil tight casing and receives motion either from a cam race or from a lever or levers operated by a cam or cam race and the other part of which is outside the oil tight casing and is there either connected to a lever or equivalent through the instrumentality of which the needle or other tool is operated, or it is connected directly to or carries the tool—for example the looper—to be operated, the axially or rotatably or both axially and rotatably movable rod passing through a stuffing box or gland with which the wall of the oil tight casing is provided.

In the accompanying drawing I have illustrated embodiments of my invention applied to a sewing machine in which.

Figure 1:
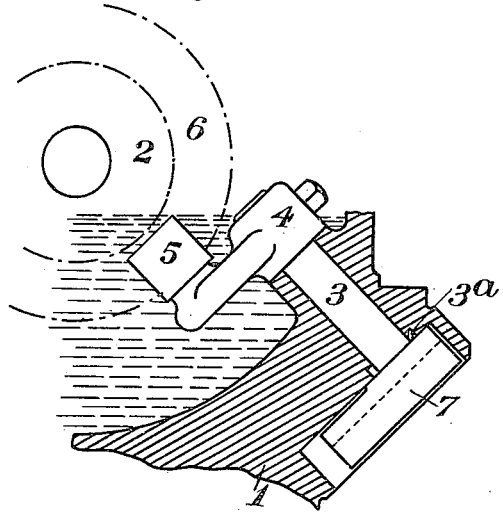
Figure 1 represents an elevation partly in section of my invention applied to an awl feed slide.

Referring to Fig. 1 of the drawing, 1 is is an oil tight casing which surrounds the cam cylinder 2 of a sewing machine.

To impart the reciprocating or feed movements to the awl the rocking spindle or stud on which the awl carrier is supported is in turn carried by a feed slide. To impart reciprocating movement to said slide, I provide a tube or spindle 3 which is journaled in a bearing formed in the wall of the casing 1 and which in the embodiment of the invention herein shown is arranged at an inclination. A recess 3ª is provided in said wall for the reception of packing material thereby to make an oil-tight joint. I provide a crank or lever 4 fixedly connected to the spindle or tube 3 the free end of which lever engages—by a cam roll 5—in a suitable cam race 6 in the cam cylinder so that as the cam cylinder rotates the spindle or tube will be rocked around its axis. Outside of the oil tight casing I fix to the spindle or tube 3 another crank or lever 7 having a slot or groove therein to receive adjustably a sliding block and stud which may be adjustably connected to the feed slide so that by adjusting the stud and block in one direction or the other relative to a slot in said slide, a shorter or longer reciprocating and consequently feed movement is imparted to the feed slide and through it to the awl.

To prevent axial movement of the spindle or tube I preferably make the parts so that the two cranks 4, 7 serve to prevent such axial movement or I may provide a collar or collars on said spindle which abut against the ends of the gland or stuffing box.

Figure 2:
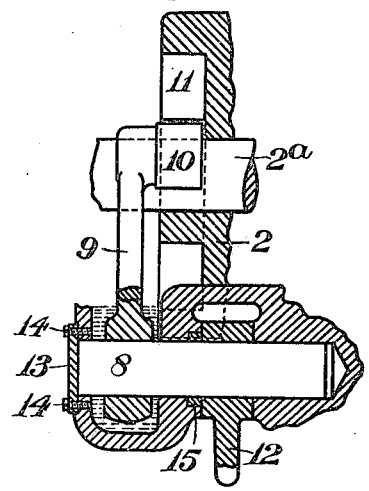
Fig. 2 is an elevation partly in section of my invention applied to a take-up.

Referring to Fig. 2 of the drawing, 1 is the oil tight casing which surrounds the cam cylinder 2.

To impart movement to the thread take-up I provide a rod or tube 8 which is journaled in the wall of the casing and is parallel to the cam shaft $2^a$. A portion of said rod or tube extends into the oil-tight casing and has fixed thereto a crank or lever 9 the free end of which has a cam roll 10 in engagement with a suitable cam race 11 in the cam cylinder 2 whereby when said cylinder rotates rotary rocking movements are imparted to the rod or tube. On the part of said rod or tube which is outside the oil tight casing I also fix a crank or lever 12 by which a take-up lever may be operated.

I preferably make the parts so that the two cranks or levers 9, 12 will prevent axial movement of the rod or tube 8 or I may provide one or if desired two collars for that purpose.

In order that the rod or tube 8 may be inserted into its bearing I form the oil tight casing with an aperture which aperture after said rod and cranks 9, 12 have been positioned is closed by a cover plate 13 held in place by screws 14 or the like.

The wall of the casing is preferably provided with a recess 15 for the reception of packing or like material.

Figure 3:
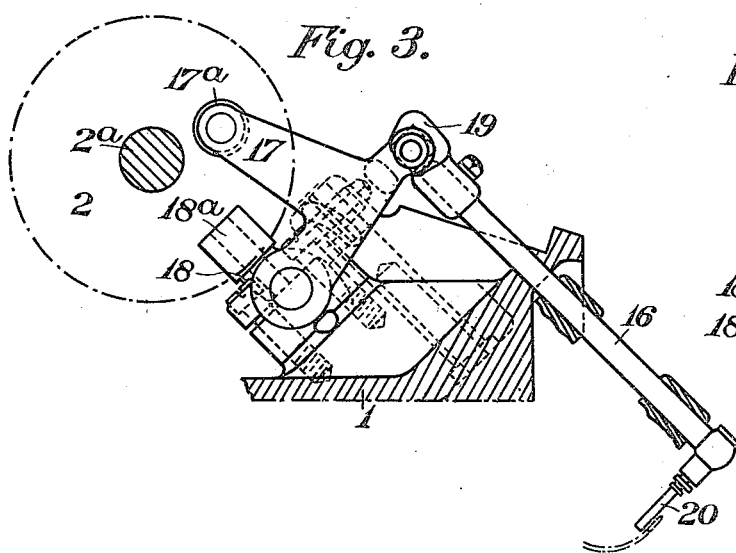
Figs. 3 and 4 are elevations partly in section and at right angles to each other of my invention applied to a looper.
Figure 4:
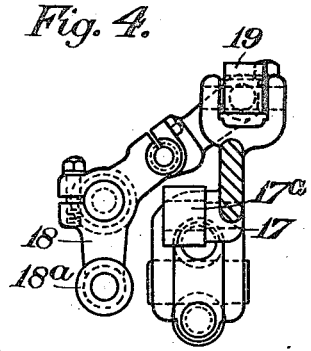

Referring to Figs. 3 and 4 of the drawing 1 is a portion of the oil tight casing which surrounds the cam cylinder 2. To impart the required movements to the looper I employ a rod or tube 16 which passes through a bearing in the wall of the oil tight casing 1 and within the oil tight casing I mount two *quasi* bell crank levers 17, 18, carrying cam rollers $17^a$, $18^a$, which are rocked by suitable cam races on the cam cylinder, one lever rocking in a direction angular to the rocking movements of the other lever. One arm of one of said levers is connected by a suitable swivel 19 to an arm of the other lever and both levers are connected to the rod or tube 16 in such a manner that one lever imparts axial reciprocating movements to the rod or tube and the other imparts rotary rocking movements thereto. The cam races are so timed relatively to each other that the axial and rocking movements are imparted simultaneously to the bar or tube in such a manner that the free end of the looper 20—which latter is fixed to the end of the rod or tube outside the oil tight casing—will describe a circle or approximately a circle to thereby lay the thread around the needle in the well known manner.

What I claim as my invention and desire to secure by Letters Patent is:—

In a device of the class described, the combination with a driving cam member, of an oil-tight casing in which said cam member is received and which is adapted to receive sufficient lubricating oil so that said cam member will be at least partially immersed in the oil, an oscillatory shaft journaled in and extending through the wall of the casing at a point below the level of the oil therein, means making an oil-tight joint between said shaft and casing, an arm connected to the inner end of said shaft within said casing, and having operative engagement with said cam, and a tool-actuating member on the outer end of said shaft exterior to said casing.

In testimony whereof I have signed my name to this specification in the presence of two subscribing witnesses.

MARK THOMAS DENNE.

Witnesses:
A. E. WILLIAMS,
M. POLLON.

Copies of this patent may be obtained for five cents each, by addressing the "Commissioner of Patents, Washington, D. C."